United States Patent [19]
Campbell et al.

[11] 3,796,125
[45] Mar. 12, 1974

[54] BLIND FASTENER CONSTRUCTION

[75] Inventors: James R. Campbell, South Laguna; Miles Rainwater, Costa Mesa, both of Calif.

[73] Assignee: Thomas P. Mahoney, Santa Monica, Calif. ; by said Rainwater

[22] Filed: Nov. 17, 1971

[21] Appl. No.: 199,514

[52] U.S. Cl. .................................................. 85/77
[51] Int. Cl. .......................................... F16b 13/06
[58] Field of Search .............. 85/77, 78, 72, 73, 74, 85/75; 29/512, 522

[56] References Cited
UNITED STATES PATENTS

| | | | |
|---|---|---|---|
| 2,282,711 | 5/1942 | Eklund................................... | 85/72 |
| 3,107,572 | 10/1963 | Orloff................................. | 85/73 X |
| 3,515,419 | 6/1970 | Baugh................................. | 85/78 X |
| 2,974,558 | 3/1961 | Hodell................................. | 85/77 |

*Primary Examiner*—Ramon S. Britts
*Attorney, Agent, or Firm*—Mahoney, Schick & Cislo

[57] ABSTRACT

A blind fastener incorporates a carrier having a forming area or portion thereupon. Mounted on the carrier is a securement member having a deformable lower extremity. Also mounted on the carrier is a driver which is utilized to drive the securement member against the forming portion of the carrier to urge the extremity of the securement member into securement relationship with an object or objects with which the fastener is associated.

The carrier incorporates an elongated shank having a frangible shear zone and the driver incorporates driving and locking portions also separated by a shear zone. The locking portion of the driver is received in a locking recess in the securement member and the shear zones are ruptured successively when predetermined loads are imposed thereupon resulting from the complete deformation of the extremity of the securement member and the reception of the locking portion in said locking recess.

4 Claims, 20 Drawing Figures

PATENTED MAR 12 1974  3,796,125
SHEET 1 OF 3
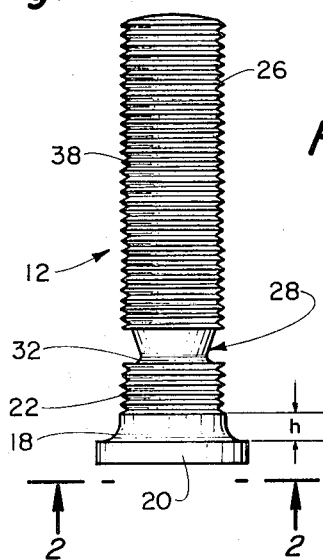
Fig. 1.
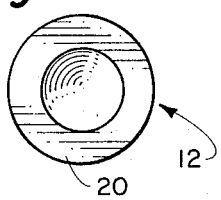
Fig. 2.
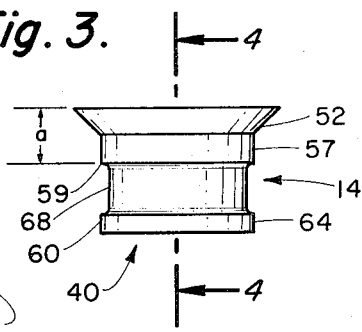
Fig. 3.
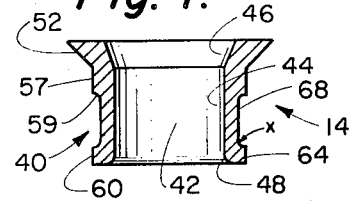
Fig. 4.
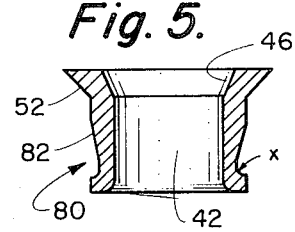
Fig. 5.
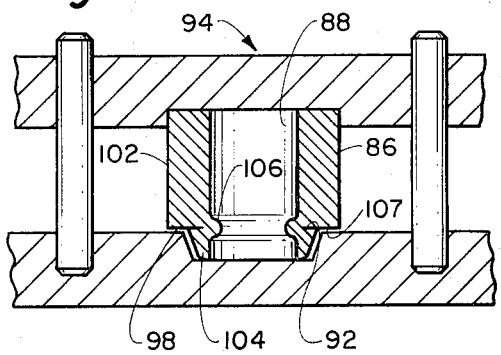
Fig. 8.
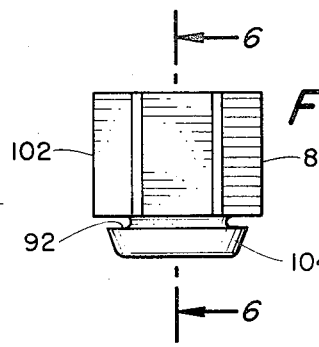
Fig. 6.
Fig. 7.
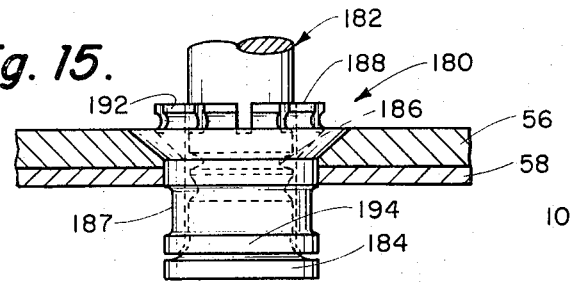
Fig. 15.
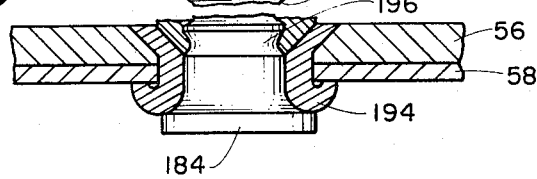
Fig. 16.
INVENTORS.
JAMES R. CAMPBELL
MILES RAINWATER
BY MAHONEY, HORNBAKER
AND SCHICK
ATTORNEYS

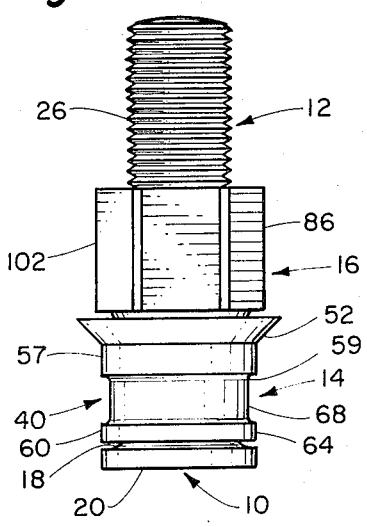
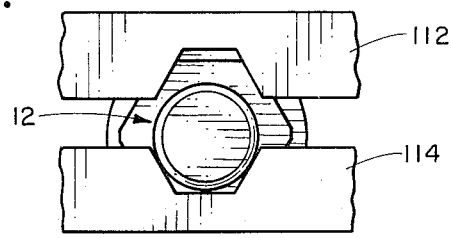
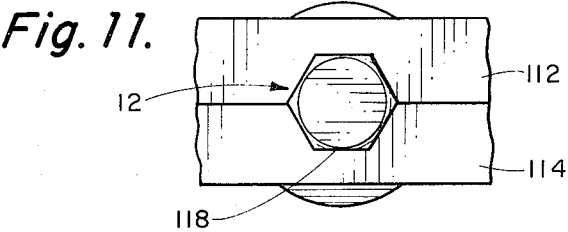
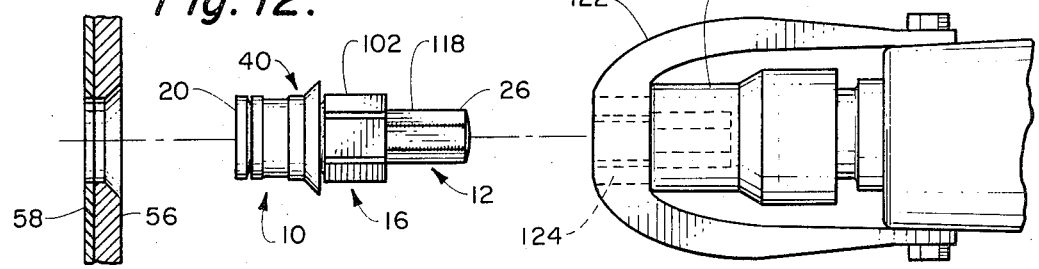
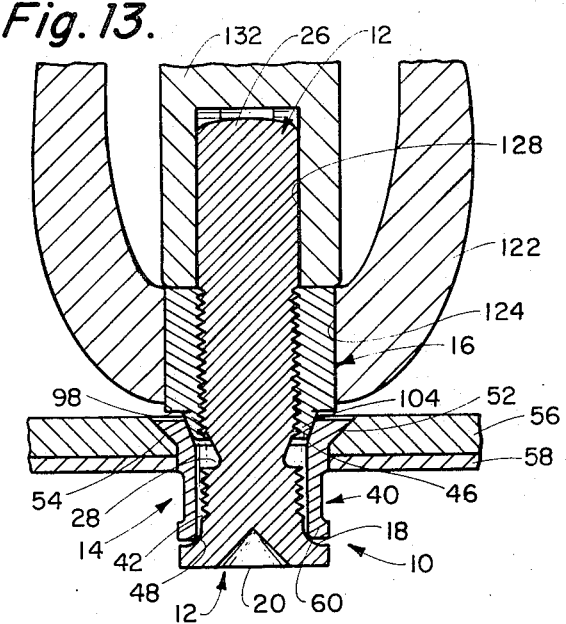
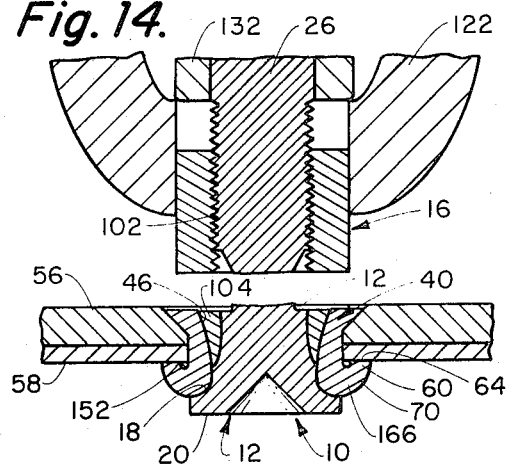

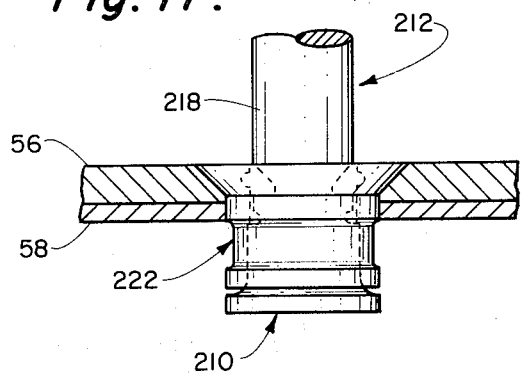
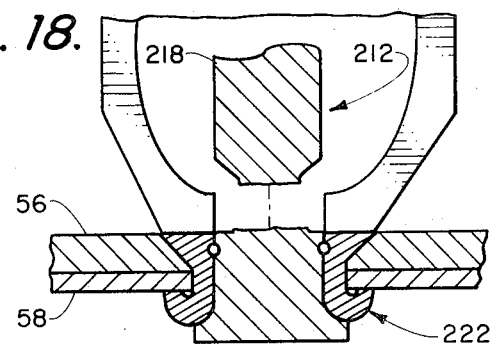
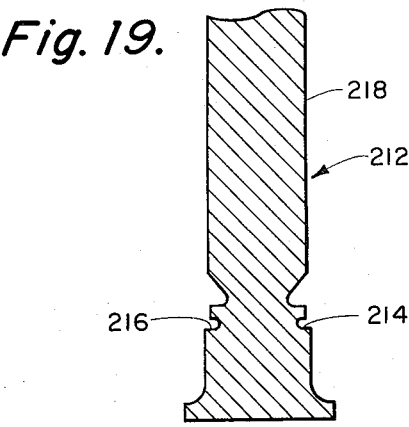
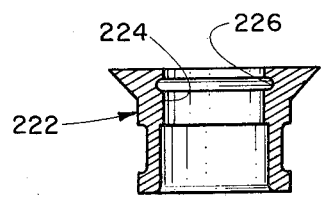

BLIND FASTENER CONSTRUCTION

BACKGROUND OF THE INVENTION

Blind fasteners are commonly utilized in applications where the inner extremity of the fastener is inaccessible and, therefore, can not have a corresponding nut or other member applied thereto to cause the permanent securement of the same. For instance, blind fasteners of the rivet variety are frequently used in aircraft fuselage and wing assembly where the location of a bucking bar in the interior of the structure to upset the inner extremity of a conventional rivet is not feasible. In such applications the blind rivet is inserted through an opening or corresponding openings in the fuselage structure and the inner extremity thereof is upset by a wide variety of techniques, which include the utilization of a mandrel to collapse the inner end of a tubular rivet structure, and the like. As a matter of fact, the larger number of blind fastener applications is to be found in the rivet art and there has been a significant advance in this art concomitant the increased sophistication in aircraft and missile structures.

However, most blind fasteners, including those of the rivet variety, are characterized by the fact that the devices or techniques utilized in deforming or expanding the inner extremity of the rivet or blind fastener to form a securement head thereupon usually result in irregularly formed or deformed protuberances or bulbs on the inner end of the blind fastener construction. These protuberances or bulbs are found upon and engage the sharp edge of the blind hole. Therefore, only lineal engagement of the bulb with the blind sheet is achieved. Furthermore, the presence of burrs or sharp edges on the area of lineal contact will create incipient cracking in the bulb as it is formed thus materially reducing the effectiveness of the fastener grip.

In addition, since many of the blind fasteners now in use are of tubular construction, the relatively thin walls of the inner extremities thereof, when subjected to an expansive force, such as a collapsing mandrel, tend to immediately be subjected to incipient cracking which is, in part, attributable to work hardening of the wall of the tubular structure which is being deformed.

Therefore, the unpredictable results of prior art structures utilized to achieve the deformation of the inner extremities of blind fasteners has prevented the application of such blind fasteners to structures where loads are encountered which could be effectively sustained by conventional rivets or by conventional bolt type fasteners. Consequently, access doors and openings have had to be provided in these critical structural areas so that access may be had by the fabricating mechanic to the interior surfaces of the structure to accomplish the upsetting of the interior extremities of rivets or the application of nuts or other expedients to the inner extremities of bolt-type fasteners.

Most blind fasteners, which swell or bulge a tubular member, engage the blind side hole corner during the drive and create localized stresses on the corner area and incipient fracture problems when this corner is significantly burred.

Also the drawing together of the sheets being fastened involves a rubbing action on this corner. Further, no commercially available blind fastener under all conditions of installation engage the blind side sheet at an annular zone remote from the corner of the blind hole.

Another major disadvantage of conventional blind fasteners is that there is usually no visual external indication of the condition of the fastener assembly after it has been operated upon to cause the upsetting of the inner extremity thereof to secure the structural elements to which it is applied together. In other words, there is usually an external head structure of conventional configuration provided on the blind fastener and the only indication that something has taken place in the internal structure of the aircraft, missile or other device to which the fastener is applied is that a mandrel or other member has been pulled through the fastener construction to a predetermined extent.

OBJECTS AND SUMMARY OF THE INVENTION

It is, therefore, a primary object of our invention to provide a blind fastener which is particularly characterized by the fact that the blind securement head or ring formed thereupon engages the blind sheet or surface over a substantial annular area removed from the sharp edge of the blind hole. Therefore, relatively massive area rather than linear contact is achieved.

Moreover, the incipient cracking and cutting of the securement bulb characteristic of prior art constructions is completely eliminated.

An associated object of the invention is the provision of a blind fastener of the aforementioned character wherein the fastener when driven into the associated structures includes a locking ring at the exterior side of the structure and a securement ring on the blind side of the structure with the full engagement of the locking ring indicating completed fabrication of the securement ring.

Another object of our invention is the provision of a composite blind fastener which includes a carrier having a forming ring or portion thereupon or associated therewith which is intended to accomplish the function of deforming the associated extremity of a securement member which is disposed in encompassing relationship with said carrier into a securement ring, and which is adapted to be driven into operative engagement with said forming area or portion by a contiguous driver axially movable upon said carrier until the desired deformation of the aforesaid extremity of said securement member into the desired securement ring has been accomplished.

An additional object of our invention is the provision of a blind fastener of the aforementioned character wherein the aforesaid carrier incorporates an elongated shank adjacent said forming area or ring and said forming area or ring is separable from said shank by a frangible shear or frangible area incorporated therein and susceptible to shearing or breaking off when the aforesaid complete deformation of the lower extremity of a securement member of the fastener into a securement ring is accomplished.

A further object of our invention is the provision of a blind fastener of the aforementioned character which is characterized by the fact that the aforesaid driver is composite in nature, that is, performs a plurality of functions. To accomplish the plurality of functions, the driver includes a driving portion and a locking portion or ring, said driving and locking portions having a line of demarcation therebetween constituted by a shear zone which is frangible and which is adapted to be sheared immediately prior to the shearing of the shear area of the associated carrier.

An associated object of our invention is the provision of a blind fastener of the aforementioned character wherein the aforesaid securement member incorporates a head portion having a locking recess therein, and said locking recess is adapted to receive the locking portion or ring of said driver in locking relationship simultaneously with the completion of the deformation of the lower extremity of said securement member into the desired securement ring configuration.

Therefore, when the desired formation of the securement ring is accomplished, physical evidence of such accomplishment is presented by the permanent reception and retention of the aforesaid locking portion of said driver in the locking receptacle and in the head of the securement member. Of course, the shearing action which results from the positive engagement of the locking portion of the driver and the positive deformation of the relevant extremity of the securement member also provides physical indication of the achievement of the desired configuration on the inner extremity of the blind fastener.

A further object of our invention is the provision, in a blind fastener of the aforementioned character, of a combination of surfaces and dimensions, to be alluded to in detail hereinbelow, which result in a fastener which is completely capable of accommodating different gauges of material, different configurations of material and which is reasonably grip insensitive, that is, capable of securing materials of different gauges in secure relationship and contiguity with each other.

An additional object of our invention is the provision of a method of installing the aforesaid fastener which includes the steps of relatively moving the driver and the carrier to accomplish corresponding relative axial movement of the extremity of the securement member over the corresponding forming ring of the carrier to accomplish the axial and radial deformation of said extremity into a securement ring which engages the inner surface of an object in an annular zone remote from the edge of the blind hole. A further step involves the successive shearing of the shear area of the driver and shear zone of the carrier to leave a minimal residual structure at the external surface of the blind fastener which can subsequently be buffed or abraded away.

BRIEF DESCRIPTION OF THE DRAWINGS

FIG. 1 is a vertical elevational view illustrating the carrier incorporated in the blind fastener;

FIG. 2 is a bottom plan view taken from the broken line 2—2 of FIG. 1;

FIG. 3 is a side elevational view of the securement member associated with the carrier of the blind fastener;

FIG. 4 is a vertical sectional view taken on the broken line 4—4 of FIG. 3;

FIG. 5 is a vertical sectional view similar to FIG. 4 but showing a slightly different configuration of securement member;

FIG. 6 is a side elevational view of an initial state of a driver blank prior to its being subjected to operations adapting it for utilization in the fastener combination;

FIG. 7 is a vertical sectional view taken from broken lines 6—6 of FIG. 6;

FIG. 8 is a sectional view showing a step in the preparation of the driver blank of FIGS. 6 and 7 for fastener application;

FIG. 9 is a side elevational view of the assembled elements of the blind fastener prior to the subjection of the fastener to additional steps of fabrication;

FIG. 10 is a schematic view illustrating the utilization of die deformation on the shank of the carrier portion of the blind fastener;

FIG. 11 is a view similar to FIG. 10 showing the completion of the die deformation of said shank;

FIG. 12 is a composite view illustrating the relationship between various elements of the blind fastener and the corresponding orifices in juxtapositioned sheets of material together with a side view of a typical installing device;

FIG. 13 is an enlarged vertical sectional view showing the manner in which an installation tool can be utilized in conjunction with one embodiment of the blind fastener of the invention prior to energization of the tool;

FIG. 14 shows the completion of the installation steps which result in the permanent affixation of the fastener in the corresponding openings;

FIG. 15 is a vertical, enlarged partly sectional view showing an alternative embodiment of the blind fastener of the invention prior to its final securement in the associated structure;

FIG. 16 is a view corresponding to FIG. 15 showing the termination of the securement steps;

FIG. 17 is a partially sectional view showing the application of an alternative embodiment of fastener of the invention;

FIG. 18 is a view similar to FIG. 17 showing the completion of the installation of the fastener of FIG. 17;

FIG. 19 is a view showing the carrier in elevation; and

FIG. 20 is a vertical sectional view of the securement member.

DESCRIPTION OF THE EMBODIMENTS OF THE INVENTION

Referring to the drawings, and particularly to FIGS. 1 - 13 thereof, we show a blind fastener 10, FIG. 9, which includes a carrier 12, FIG. 1, a securement member 14 and a driver 16.

The carrier 12, as the best shown in FIG. 1 of the drawings, is provided with a forming area or ring 18 at its lower extremity, said area or ring 18 being subtended by a relatively massive foot 20 to sustain the loads to which the forming area or ring 18 is subjected during the application of the fastener 10 in a desired structure. The diameter of the foot 20 is such as to be receivable in corresponding openings or holes in the parts to be secured in operative relationship. The transition between the lower and upper extremities of the forming ring 18, which is, of course, a portion of the carrier 12, is a radius which is approximately between one-eighth and one-fifteenth of the diameter of the holes in which the fastener 10 is located, such diameter being dependent also on the sharpness of formation of the deformed portion of the securement member to be achieved.

The distance "$h$," FIG. 1, between the end of the threaded portion 22 of the carrier 12 and the upper extremity of the foot 20, that is, the height of the forming ring 18, is determined by the total thickness of the parts to be fastened in operative relationship with each other. The grip range or tolerance on a seven-sixteenths inch diameter fastener is about plus or minus 0.03 inches. For example, in the range of 0.140 to 0.170 total sheet thickness, the value of "$h$" is about 0.080. If the total sheet thickness was 0.75 inches, the value of "$h$" would be about 0.595 inches. Therefore, as can be readily determined, the height "$h$" of the ring 18 will vary direction with the thickness of the sheets or other structures to be fastened together. Obviously, the thicker the structure to be fastened, the greater the height.

As previously mentioned, the forming ring 18 is provided with a radius to accomplish the outward and turning moment of the relevant extremity of the securement member 12 in a manner to be described in greater detail below. We have found that a satisfactory radius to accomplish the desired result is one-tenth of the hole diameter although there is a relatively wide range of approximately one-eighth to one-fifteenth of the hole diameter available, but superior formation of the deformable portion of the securement member 12 occurs in one-tenth hole diameter range.

Incorporated in the stem or shank 26 of the carrier 12 is a shear or break-off area 28 constituted by a groove 32. The location of the shear area or groove 32 is determined by the thickness of the sheets of material or structures to be fastened together by the fastener 10 since, as will be rendered apparent from the further consideration of the manner of installation, the lower portion of the groove must be disposed at or above the external surface of the sheets or structures being fastened. A thread 38 continuous with the thread 22 in its pitch and diameter is provided on the upper extremity of the shank 26.

The thread portions 22 and 38 on the carrier 12 are preferably fine threads. For example, on a five-sixteenths diameter, shank 26 where the forming ring 18 has a seven-sixteenths diameter, the preferred thread is a 5/16-32 or even a 5/16-40. The fine thread provides, as will be described in greater detail below, significant mechanical advantages in cooperation with the driver 16 which materially assists in the formation of the proper configuration at the lower extremity of the securement member 14 and also provides a greater difference between the thread root diameter and the diameter of the shear groove or area 28.

The carrier 10 may be fabricated from any desired material, but we have found that such materials as Armco 17–4PH aged to 200,000/in$^2$; Ti 6 Al–4V, Inco 717, and Rene 41 are extremely adaptable for this particular application.

The surface condition on the forming ring 18 is not critical; suitable deformation of the relevant extremity of the securement member 14 can be achieved where the finish has been produced by a carbide cutting tool with no other additional treatment. Furthermore, if the surface is rolled on the ring 18, correspondingly excellent results to those achieved by other means are obtained.

Disposed in encompassing relationship with the lower extremity of the carrier 10 is the securement member 14, said securement member being constituted by a tubular bushing 40 which incorporates a longitudinal bore 42, said bore 42 being constituted by a substantially cylindrical portion 44 terminating at its upper extremity, as best shown in FIG. 4 of the drawings, in a locking receptacle 46 of frusto-conical configuration. The wall of the bore 42 terminates at its lower extremity in a radiused section or portion 48 which, as best shown in FIG. 13 of the drawings, is disposed in overlying relationship with the radius provided on the forming ring 18 immediately above the foot 20 which subtends the ring 18.

Provided on the upper extremity of the bushing 40 is a frusto-conical head 52 which is adapted to be received in a corresponding receptacle or recess 54 formed in the outermost 56 of two sheets of material 56 and 58, as best shown in FIG. 13 of the drawings. Of course, the blind fastener 10 of the invention can be provided with a securement member 14 defined by bushing having a head shape of any desired configuration, and the depiction of a frusto-conical head portion in the drawings as exemplified in one embodiment of the invention, is not intended to limit the concept thereof to a particular head configuration.

Disposed below the frusto-conical head 52 of the bushing 40 is a cylindrical shoulder 57 provided with a land 59. The dimension "$a$" which is shown in FIG. 3 as including the distance between the top of the head 52 and the land 59 of the shoulder 57 is usually substantially equivalent to the total thickness of the superimposed sheets 56 and 58 of material to be secured in operative relationship with each other, as best shown in FIG. 13 of the drawings.

A forming foot 60 is provided upon the lower extremity of the bushing 40 and its lower extreme end is provided by the radiused wall section 48 of the bore 42.

The foot 60 has an axial external surface 64 whose diameter is such as to be receivable in the contiguous openings formed in superimposed sheets 56 and 58, as best shown in FIG. 13 of the drawings. The length of the axial external surface 64 of the foot 60 is about one-eighth of the diameter of the holes through which the foot is inserted. For instance on a 7/16 inch hole, the length would be approximately 0.055 inch.

Interposed between the shoulder 56 and the foot 60 is an elongated cylindrical groove 68, which operates, in a manner to be described in greater detail below, in conjunction with the foot 60 to facilitate the formation of a desired configuration of the lower extremity of the securement member 14.

Since the forming of the lower extremity of the bushing 40 by axial movement against the forming ring 18 involves considerable cold working of the material from which the bushing is fabricated, it is necessary to utilize a metal which has adequate elongation properties and a fairly high degree of work hardening. In many applications ancillary characteristics such as corrosion resistance and freedom from stress corrosion are important. Furthermore, as the lower extremity of the bushing 40 is deformed, it is desirable that the material be characterized by low galling as it slides over the forming ring 18 of the carrier 12.

Among the materials which have been utilized in prototype blind fasteners has been Armco steel alloy 15–16WR. A typical bar of this material has the following solution annealed properties:

| Hardness | Ultimate Tensile KSI | 0.2% yield KSI | % elong. | % Reduction of Area |
|---|---|---|---|---|
| 93 | 114 | 76 | 49 | 59 |

When the material is subjected to cold working equal to 26.5 percent cold reduction, the following properties have been determined:

| Ultimate Tensile KSI | 0.2% Yield KSI | % Reduction of Area |
| --- | --- | --- |
| 181 | 136 | 38 |

The above mentioned material is also characterized by high resistance to corrosion, stress corrosion, high temperature oxidation and galling which are the characteristics desirable for a properly functioning bushing 40. Another satisfactory material is Allegheny Ludlum A–286 solution annealed.

Titanium bushings have been fabricated from Ti 3a1–2–1/2V, which provides the most effective bushing from a strength standpoint. This is particularly the case if this particular material can be obtained with approximately 35 percent elongation. Other Titanium alloys have been experimented with, but they are either too hard, too weak or too difficult to form.

The wall thickness of the bore 42 and the thickness of the foot 60, both measured radially of the axis of the bore 42, determine the strength and the configuration of the formed securement ring 70 of the bushing 40, as best shown in FIG. 14 of the drawings, when the complete installation of the fastener 10 has been accomplished.

Therefore, it can be readily ascertained that the thickness of the wall of the bore 42 in the region of the groove 68 is determined in the manner in which the grooved portion and the foot portion of the bushing are deformed even though, after the forming of the securement ring 70, as best shown in FIG. 14 of the drawings, the groove has been eliminated by the forming action of the foot 20 and the forming ring 18 of the carrier 26.

No particular finishing operation is required for surfacing the bushing 40 since conventional tools provide adequate surface finish.

An alternative bushing configuration 80 is shown in FIG. 5 of the drawings, and is distinguishable from the bushing 40 in the provision of a tapered wall 82 for the grooved area of the bushing. This bushing configuration is utilized where the necessity for extreme preload or filling of the openings in the sheets to be secured in operative relationship is indicated. Of course, variations in the configurations of the wall of the grooves portion of the bushing constituting the securement member 14 may be dictated by specifics of application, but such variations will obviously fall within the broad scope of the teachings of the invention.

The driver 16 incorporated in the fastener 10 is shown in completed form in FIGS. 9 and 12–13 of the drawings. However, since the driver 16 is subjected to a series of fabricating steps to achieve the final configuration of FIGS. 9 and 12–13, reference is made to FIG. 6 of the drawings which shows a blank 86 fabricated from stock. After the requisite length of hexagonal stock has been cut, it is drilled to provide the bore 88 and turned to provide the groove 92. However, it should be understood that references herein to specific modes of manufacture do not have a limiting connotation because other modes and operations will be apparent to those skilled in the art which will be equally satisfactory to those disclosed, and the disclosure herein of manufacturing techniques is intended to support claims to the best known method of fabricating the disclosed blind fastener.

In turning the groove 92, a wall thickness of approximately 0.005 inch is permitted to remain and on a 7/16 inch diameter fastener, the groove is about 0.03 inch wide.

After the blank 86 has been fabricated, it is placed in an appropriate press 94 to collapse the groove 92 axially. The blank 86, as best shown in FIG. 8 of the drawings, is then characterized by the fact that a shear or frangible zone 98 has been provided between an upper driving portion 102 and a lower locking ring or portion 104 of the resulting driver 16. A driving surface or engagement portion 107 is provided on the lower extremity of said upper driving portion 102 to engage the head 52 of the securement member 14 in a manner to be described in greater detail below. There is also an internal bulge 106 in the wall of the bore 88 attributable to the collapsing of the groove 92.

To eliminate this bulge, the bore 88 is drilled and is subsequently tapped to provide a fine thread corresponding to the thread portions 22 and 38 provided upon the carrier 12. The relationship of the driver 16 with the carrier 12 and securement member 14 when all of the elements are assembled in operative relationship is best shown by the sectional view of FIG. 13 wherein the locking portion or ring 104 of the driver 16 is shown as partially received within the frusto-conical locking recess 46 provided at the upper extremity of the bore 42 of the bushing 40 constituting the securement member 14.

It will be noted that, when the blind fastener 10 is inserted in the corresponding openings in the sheets 56 and 58, as best shown in FIG. 13 of the drawings, the frusto-conical locking ring or portion 104 of the driver 16 is partially located within the confines of the locking recess 46 so that the shear zone 98 of the driver is disposed above the plane constituted by the outer surface of the uppermost sheet 56 of the pair of sheets 56 and 58. It will also be noted that the shear area 28 of the carrier 12 is disposed below the lower extremity of the driver 16.

Although the fabrication of the driving and locking portions of the driver 16 has been disclosed as accomplished from a unitary blank, it will be obvious to those skilled in the art that different modes of creating the same relationship can be accomplished as by resistance welding a separately fabricated locking portion or ring to the driving portion, or by bonding.

Of course, it is essential that the locking portion 104 of the driver be positively attached to the driving portion 102 so that, in the initial stages of installation of the blind fastener, the driving and locking portions act as a unitary structure and so that the locking portion or ring will not act as a lock nut in relationship to the driving portion 102. The material from which the driver 16 is fabricated can be of any type compatible with the other components of the blind fastener 10 from the viewpoints of galvanic action, thermal expansion, strength, temperature requirements and reasonable freedom from galling particularly in the threads and between the heavy drive surface 107 at the lower extremity of the driving portion 102, FIG. 8, which engages the top surface of the head 52 of the bushing 40.

Suitable materials include Armco 17–4PH aged to H.900 which works well on a carrier shank 26 of the same type of material in conjunction with an Armco 15-16WR bushing.

With a titanium fastener the driver 16 would preferably be fabricated from Beta III or Ti – 6A AL – 4V or Ti – 3Al – 2 – 1/2V.

Prior to assembly of the various components of the blind fastener 10, the threaded portions 22 and 38 of the shank 26 are precoated with a light film of Molybdenum disulfide powder either by dipping or spraying. The securement member 14 is then placed on the carrier 12 and the driver 16 threaded upon the corresponding threads of the carrier 12. If desired, additional lubrication can be applied to the threads and the driver 16 then screwed down to firmly hold the securement member 14 against the forming ring 18. Prelubrication of the assembly in this manner lubricates the inter-engaged threads, the tapered engagement of the locking ring or portion 104 and the locking receptacle 46, the internal bore 42 of the securement member 14 and he adjacent surfaces of the forming ring 18 and the radius portion 48 of the bore 42.

With the component parts of the blind fastener 10 assembled in the above described manner, the shank 26 of the carrier 12 is placed between die sections 112 and 114 to impart a hexagonal configuration 118 to the protruding portion of the shank 26, which prevents the components from being dissembled from one another and provides drive surfaces upon the protruding portion of the shank 26 of the carrier 12, as best shown in FIGS. 12–14 of the drawings.

The driving or installation of the blind fastener 10 can be accomplished by the utilization of a wide variety of installation tools, but, in the rotary driving configuration which has been described hereinabove, a tool is utilized which incorporates a frame 122 having a hexagonal receptacle 124 for the reception of the hexagonal driving portion of the driver 16. The hexagonal portion of the shank 26 of the carrier 12 is received in a correspondingly shaped receptacle 128 of the drive sprocket of an impact wrench or the like.

After the installation of the respective components of the blind fastener 10 in the associated installation tool, the blind fastener is inserted into the corresponding openings of the respective sheets 56 and 58 to locate the fastener 10 in the orientation shown in FIG. 13 of the drawings. Rotation of the socket 132 causes relative movement between the shank 26 of the carrier 12 and the driver 16 causing the driver to move downwardly toward the outer surface of the sheet 56 while causing the lower extremity or foot of the carrier 12 to be drawn upwardly toward the underside of the sheet 58.

Of course, the relative distance travelled by the carrier 12 is much greater than the distance that the driver moves downwardly to engage its heavy driving or engagement face 107 with the upper surface of the head 52 of the bushing 40 and to drive the locking ring or portion 104 into the corresponding receptacle 46 of the bushing 40. The downward movement of the locking ring 104 begins during the radial and upward axial movement of the foot or extremity 60 of the bushing 40 into the securement ring configuration shown at 70 in FIG. 14 of the drawings.

As the shank 26 is turned by the drive socket of the tool to back it out of the driver 16, all of the components of the fastener are pulled toward each other while providing some spinning action on the bushing 40 during the formation of the securement ring 70.

There may be a semantic question arising as to the use of the terminology for the driver 16 since the carrier 12 is actually rotated by the action of the impact wrench utilized to install the fastener. However, the carrier 12 actually acts as a lead screw to urge the driver 16 downwardly at the final moments of the assembly of the components to cause the locking ring 104 to deform into the space remaining between the wall of the locking recess 46 of the bushing 40 and the perimeter of the remaining portion of the carrier 12 and to ultimately separate from the driver after being driven deeply into the locking recess until tightly wedged between recess and carrier, as best shown in FIG. 14 of the drawings.

The torque output of the impact wrench utilized as an installation tool must be set at a value above the breakoff torque of the shear area 28 of the carrier 12. For example, on a 7/16 diameter blind fastener with a 0.02 inch breakoff groove 32, the breakoff torque is about 60 foot lbs. Thus, it is desirable that the torque wrench be set for its maximum torque of approximately 250 foot lbs. to achieve the greatest speed of installation and the desired rupturing of the shear area 28 of the carrier 12.

It is not necessary to remove burrs on the blind side of the holes since such burrs do not detract from the formation of the locking ring 70. As a matter of fact, when the locking ring 70 is formed, a burr pocket 152 is provided, as best shown in FIG. 14 of the drawings, which accommodates the burrs. This pocket can also receive an elastomeric ring which is installed on the bushing 40 adjacent the land 58 during the assembly of the components of the bushing. The burr pocket allows the sheets to be gripped externally of the burr, whereas conventional fasteners bulge out against the burr or the sharp corner where the burr was creating a stress concentration area of annular configuration.

Because of the manner in which the sheets are gripped externally of the burr over a significant area annular to the hole, as best shown in FIG. 14 of the drawings, an extremely strong attachment of the sheets 56 and 58 to each other is achieved. For instance on a 7/16 diameter hole, the grip area is over 1/32 inch wide.

Another important aspect of the blind fastener 10 is that it requires an extremely small blind side clearance, that is, the space between the underside of the sheet 58 and an adjacent structure. For instance, on a 7/16 inch hole size, the blind fastener 10 can be properly installed with less than 3/16 inch clearance. Other fasteners of the same size require at least 1/2 inch clearance and frequently over 1 inch clearance.

Due to the interaction of the locking ring or portion 104 of the driver 16, and the securement ring 70, the holes are completely filled and a bearing pre-stress is exerted upon the walls of the holes. The provision of the locking ring or portion 104 also serves, as best shown in FIG. 14 of the drawings, to provide an axial preload on the residual shank, thus insuring high fatigue capability. As the installation tool increases the load upon the shank 26 of the carrier 12, the shank lengthens, thus with an 8,000 lb. pull on a 5/16 stem or shank (root diameter of 0.277) having an area of 0.06 sq. inch, the stress is 8,000/0.06 or 133,000 lb.sq. inch. The elastic elongation of the stem is then $133,000/E =$ $132,000/(29\times10^6) = 0.0046$ in/in. In a ¼ inch (residual stem) this is 0.0011 inch.

After the driving portion breaks off, the residual shank remaining within the holes tends to seat the locking ring 104 more deeply in the locking recess 46 to provide for a maximum grip effect on the secured sheets of material.

During the installation of the fastener, the foot 60 of the bushing is turned 90° to engage the inner surface of the sheet 58 over a substantial annular area. In other words, the axially oriented wall 64 of the foot 60 of the bushing impinges on the underside or inner surface of the sheet 58, as best shown in FIG. 14, and the foot is connected to the remainder of the bushing by an arcuate portion 166 so that variations in the sheet composite thickness do not prevent them from being gripped by a flat surface. In other words, deviations in the thickness are taken care of by disturbing the arch and not the gripping foot.

The utilization of an elastomeric ring in conjunction with the residual burr pocket 152 has been referred to hereinabove. However, this additional elastomeric ring is not really essential because the blind fastener 10 is essentially leak proof. The bushing 40 is swelled so tightly into the holes in the adjacent sheets that irregularities of the holes are filled and the swelling is accomplished from both ends of the bushing by the cooperative action of the forming ring 18 and the lock ring 104 moving toward each other. In conventional blind fasteners, one forming member is translated through a securement member and the metal flow is in one direction which tends to move the metal of the securement member up and out of the hole on the external side.

In other words, in the blind fastener of the present invention, there is a squeezing action which takes place because of the interaction of the driver 16 and the forming ring 18 moving dynamically toward each other to cause the complete formation of the securement ring 70 and the complete installation and deformation of the locking ring 104.

In other words, the forming ring 18 by fabricating the securement ring 70 seals the internal diameter of the bushing 14 at one end and the locking ring 104 seals it at the other end. After the shearing of the frangible zones of the driver and carrier, the locking ring threads are tightly engaged and the tapered wall of the locking receptacle 46 actually collapses or reduces the diameter of the locking ring 104 to increase the seal between the ring and the threads.

Furthermore, as the foot 60 of the bushing 40 turns, it work hardens and provides a massive ring of increased strength to resist the outward flow of metal as it swings around the curling ring 18. The resistance to outward flow causes the foot 60 to move upwardly along the path of least resistance and pull the sheets together. In other words, the initial radial movement of the foot 60 over the forming ring 18 is converted into the axial movement which brings the previously axially oriented wall 64 of the foot into a horizontally planar engagement of the underside of the sheet 58.

Just prior to the breakoff of the shank 26 of the carrier 12, the increased elongation of the breakoff portion of the shank referred to hereinabove separates the lock ring 104 from the driving portion 102 thereof and since the lock ring 104 cannot turn, it actually screws itself on the threaded section 22 further into the locking receptacle 46 of the bushing 40.

Because of the dynamic action of the locking ring 104, the stem locking strength of the fastener of the invention is maximal. In actual experiments we have discovered that it takes over 6,000 lbs. force to push the stem out of the 7/16 fastener using 17-4 material for the locking ring and the stem. The locking ring 104 has three full threads in its bore and a 20° external taper which, while it fits into the locking receptacle 46, it is held upwardly from the upper surface of the heat at 52 of the bushing 40 by approximately 0.03 inches prior to driver.

Consequently, when the locking ring 104 is forced into the tapered receptacle 46 of the bushing 40, the bushing is expanded, the locking ring is compressed onto the threads or carrier and the maximum tightness of the locking ring is achieved.

Moreover, the blind fastener 10 is characterized by the cooperating shear zones or areas of the carrier 12 and driver 16 whereby the locking ring 104 breaks or shears off the driver 16 prior to the severance of the shear zone on the carrier 12, which insures that the locking ring is always located in the locking receptacle 46 of bushing 40 to the maximum depth and seated extremely tightly in the receptacle because of the interference fit between the receptacle and the locking ring and the fact that the driver forces the bushing downwardly around the locking ring to deform bushing metal around the ring between the holes in the sheets and the locking ring and shank of the carrier 12.

The resultant compressive forces exerted upon the sheets 56 and 58 are located in the most effective zones since the face 64 of the bushing 40 is displaced outwardly of the edge of the hole in the lowermost sheet 58, best shown in FIG. 14 of the drawings. In conventional bulbing fasteners, the compressive loads are exerted at the corners of the holes in both a radial and an axial direction, whereas in the blind fastener 10 of the invention, the loads are completely axial as caused by the cooperative effects and squeezing force of the locking ring 104 and securement ring 70.

Of utmost importance is the fact that the foot 60 of the bushing 40 is of relatively large diameter and is secured to the head 52 of the bushing 40 by the reduced wall section provided by the groove 68. The reduced wall section applies a turning moment to the foot 60 during the installation of the fastener 10, which creates the controlled movement of the foot 60 to cause the foot face 64 to turn upwardly and move axially against the underside of the sheet 68. The height of the groove provides a controlled distance which allows the movement of the surface 64 of the foot into engagement with the underside of the sheet 58 and the resultant pullup of the sheets 56 and 58 prior to the exertion of the massive compressive forces and swelling of and displacement of the metal due to the final driving of the locking ring 104 into the corresponding locking receptacle 46 by the driver 16. Therefore, the sheets 56 and 58 cannot be misassembled because metal has been squeezed between them prior to the exertion of the massive compressive forces alluded to hereinabove.

Of course, the inherent mechanics of the blind fastener 10 entail axial movement of the foot 20 of the carrier and the driver 16 toward each other. The previously discussed embodiment of the invention accomplishes such axial movement by rotating the shank 26 of the carrier 12.

However, such axial loads can be created by axial pulling upon relevant portions of the alternative embodiments of the fastener rather than relative rotation of the components thereof as in the previously discussed embodiments. In the blind fastener 180 shown in FIGS. 15 and 16 of the drawings, the carrier 182 has a forming ring 184 and a shear groove 186. The upper extremity 188 of the bushing 187 is "headed" so as to provide six castellations having steeply sloping slot bottoms extending radially from the bushing internal diameter at a level well below the surface of the head of the bushing, to the surface of the head of the bushing in a zone more or less determined by the OD of the upstanding castellations.

The cross-sectional area of the castellations 192 is sufficient to carry a force, as applied axially to form the bottom end of the bushing into the locking ring 194 while an axial load is imposed the carrier 182.

After the lower extremity or foot of 184 of the bushing 187 is formed into the gripping position, the application of an increasing downward force on the castellations begins to compress the castellations to cause them to move downwardly and inwardly and fill the aforementioned slots until the residual metal has moved into locking relationship with the receptacle in the upper end of the bushing and the locking groove 196 provided in the carrier 184.

In the embodiment 210 of the fastener shown in FIGS. 17–20 of the drawings, the carrier 212 is provided with an upwardly exposed cutting edge 214 on a slightly larger diameter portion of the shank of the carrier and an annular recess 216 is provided to receive cut material. Pull rings 218 are provided on the shank of the carrier 212 to facilitate the exertion of a pulling force on the shank of the carrier 212.

The bushing 222, FIG. 20, is provided with a downwardly exposed step 224 and an outward annular recess 226 above said step.

As an axial pull is imposed upon the shank of the carrier 212 through pull rings 218, the deformation of the lower extremity of the bushing 222 is initiated while the cutting edge 214 begins shearing the bushing step 224.

The sheared material from the step 224 is deposited initially in the annular recess 216 in the stem until further movement of the carrier 212 causes juxtaposition of the recess 216 with the corresponding recess 226 in the bushing and the recess 226 receives the additional deposit of material.

Consequently, the step material will be deposited in the cooperative recesses prior to the shearing of the shank of the carrier 212 from the portion of the shank deposited in the bushing 222.

We claim:

1. In a blind fastener for insertion into an opening from one side of an object, the combination of: an elongated carrier having a forming portion at one extremity, said one extremity having a diameter permitting its insertion through said opening and said forming portion incorporating an annular radiused lateral forming surface being open throughout the radial outer periphery thereof and being directed toward the other extremity of the carrier; a tubular securing member having an enlarged head at one extremity with a locking receptacle therein and an opposed deformable portion with an intermediate recess at the other extremity, said securing member encompassing said carrier with said deformable portion adjacent said forming portion, the outer diameter of said one extremity being substantially equal to said deformable portion of said securing member; and a driver encompassing said carrier intermediate its extremities axially, outwardly of said securing member, said driver having a tool engageable portion and a locking portion joined together by a frangible zone, said driver having an engagement portion intermediate said tool engageable portion and said locking portion for engaging said enlarged head to axially urge said securing member against said forming surface to deform said deformable portion of said securing member into secure engagement with the other side of said object and to lock said locking portion of said driver in said locking receptacle and said enlarged head of said securing member in said opening.

2. A blind fastener as defined in claim 1 in which said locking receptacle and said locking portion are frusto-conical.

3. A blind fastener as defined in claim 1 in which said securing member head has an upper surface adjacent said locking receptacle and said engagement portion of said driver is engageable with said upper surface when said locking portion is driven into said locking receptacle.

4. A blind fastener as defined in claim 3 in which said upper surface of said enlarged head and said engagement portion have conforming configurations to facilitate the engagement of said head and said engagement portion.

* * * * *